(12) United States Patent
Kludy et al.

(10) Patent No.: US 10,382,293 B2
(45) Date of Patent: Aug. 13, 2019

(54) SCOPED VIEW OF CLOUD CONTROL PLANE FOR DEVELOPMENT OF NEW SERVICES

(71) Applicant: Citrix Systems, Inc., Fort Lauderdale, FL (US)

(72) Inventors: Tom Kludy, Fort Lauderdale, FL (US); Luis Garcia Menchaca, Fort Lauderdale, FL (US); Jose Reyes, Fort Lauderdale, FL (US); Felipe Leon, Fort Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 256 days.

(21) Appl. No.: 15/600,894

(22) Filed: May 22, 2017

(65) Prior Publication Data
US 2018/0337835 A1 Nov. 22, 2018

(51) Int. Cl.
*G06F 15/16* (2006.01)
*H04L 12/24* (2006.01)

(52) U.S. Cl.
CPC ...... *H04L 41/5096* (2013.01); *H04L 41/5038* (2013.01); *H04L 41/5051* (2013.01)

(58) Field of Classification Search
CPC ............. H04L 41/5096; H04L 41/5038; H04L 41/5051

USPC ........................................................ 709/224
See application file for complete search history.

(56) References Cited

U.S. PATENT DOCUMENTS

| 2014/0006580 | A1* | 1/2014 | Raghu .................. G06F 9/5072 709/223 |
| 2015/0363724 | A1* | 12/2015 | Chatterjee ........ G06Q 10/06313 705/7.23 |
| 2017/0228559 | A1* | 8/2017 | Jackson .............. G06F 21/6245 |
| 2018/0316551 | A1* | 11/2018 | Subramani Nadar ... H04L 67/10 |

* cited by examiner

*Primary Examiner* — Sm A Rahman
(74) *Attorney, Agent, or Firm* — Banner & Witcoff, Ltd.

(57) ABSTRACT

Methods, systems, computer-readable media, and apparatuses method for integrating a cloud service under development with a production cloud system that includes at least one production service. A first scope is assigned for use in testing the first cloud service under development with the production cloud system, in which the first scope restricts access of the first cloud service under development to the production cloud system. A first user of the production cloud system is assigned to the first scope. A second scope is assigned to services of the production cloud system, which does not restrict access of the services of the production cloud system. Access to the first cloud service under development and to the at least one production cloud service is provided to the first user. Other users of the production cloud system are not provided access to the first cloud service under development.

20 Claims, 8 Drawing Sheets

| Scope Name | Scope Type |
|---|---|
| Service 1 | Production Scope – For Drawing Application |
| Service 2 | Production Scope – For Word Processing Application |
| Service 3 | Test Scope – For Word Processing Application |
| Service 4 | Test Scope – For Word Processing Application (Not Available for Selection) |

FIG. 8

| Scope Name | Scope Type |
|---|---|
| Service 1 | Production Scope – For Drawing Application |
| Service 2 | Production Scope – For Word Processing Application |
| Service 3 | Test Scope – For Word Processing Application (Not Available for Selection) |
| Service 4 | Test Scope – For Word Processing Application |

FIG. 9

SCOPED VIEW OF CLOUD CONTROL PLANE FOR DEVELOPMENT OF NEW SERVICES

FIELD

Aspects of the disclosure relate to computer hardware and software. In particular, one or more aspects of the disclosure generally relate to computer hardware and software for providing a scoped view of a cloud control plane, which may be used for development of new services for integration with existing production cloud services.

BACKGROUND

Cloud-based services are becoming more and more important, due to ready access to the cloud by users who can access a cloud system using various computing devices (e.g., mobile phone, tablet, personal computer) at various locations. For example, CITRIX CLOUD (by Citrix Systems of Fort Lauderdale, Fla.) offers a simple, flexible way to deliver applications, desktops, and data, to users wherever the users may be.

The building and operation of a cloud-based service involves two primary components: a) a control plane that is comprised of application programming interfaces (APIs), a provisioning system, a database, etc., and b) a data plane that corresponds to the actual resources that get provisioned via the control plane. For example, the data plane may comprise one or more cloud servers that get provisioned by the control plane, and one or more services that may be performed by the cloud-based service.

In more detail, with respect to movement of traffic (e.g., data packets, control messages) between components in a network, the control plane is used to make decisions about where the traffic is sent. The control plane may include the exchange of routing table information between routers through which traffic is to pass from a source device to a destination device. The data plane is used to forward traffic from one device to the next device along a network path. The routers/switches use what the control plane has built to pass incoming data packets and control messages to their eventual destinations.

When a new service is being developed for a cloud-based system, that new service should not have access to a production cloud system that is currently being made available to all users of the cloud-based system, since access to data should be restricted until the new service has been thoroughly tested and has met production release requirements. As such, a sandbox is typically used to test the new service separate from the services already in production. The sandbox is only made available to certain users who have been chosen to test out the new service and determine whether it affects the services in production. The sandbox is typically separated from a production cloud system by a firewall, and is not made available to normal users of the production cloud system. That way, users of the production cloud system are not adversely affected due to any problems associated with integration of the new service with existing services of the production cloud system.

An alternative approach to developing a new service is to target a different deployment of the cloud-based system, such as a deployment that can be used only for service integration. However, this alternative approach may incur significant cost, since multiple deployments need to be maintained while the new service is being tested out, requiring multiple production cloud systems and the increased storage requirements associated therewith. Also, additional operational staff (e.g., network administrators, IT personnel) are needed to maintain and support each of the multiple deployments, resulting in additional costs associated with this approach.

There is a need to provide for a seamless integration of a service into a production cloud system, while such service is still in development and being tested, and which does not cause adverse impacts to users of the production cloud system.

SUMMARY

Aspects of the disclosure relate to various systems and techniques that provide for integration of a service into a production cloud system, and that allow for streamlined testing of the service without adversely affecting customers accessing the production cloud system.

To enable streamlined integration of a new service to be tested with a production cloud system that includes one or more production level services, a scope providing limited access to resources of the production cloud system is assigned to the new service. Customers may be assigned to test the new service by assigning those customers to the same scope as the new service. The customer(s) assigned to test the new service are provided access to the production level services and to the new service. The new service is provided access to information of the test customers but not to information of customers who are not assigned to the same scope as is assigned to the new service. When the new service has successfully completed its testing and development and is ready for incorporation into the production cloud system, the scope assigned to the new service may be deleted, which results in deleting of the test customers (who are also assigned to the same deleted scope) from being able to access the new service and from being able to access the services of the production cloud system. A new scope that provides full access to resources of the production cloud system may then be assigned to the new service that has successfully completed its testing. This enables transitioning the new service to the production cloud system with minimal impact on the production cloud system during testing of the new service and up to and including incorporation of the new service into the production cloud system.

At least one embodiment is directed to a method for integrating a first cloud service under development with a production cloud system that includes at least one production cloud service. A cloud control plane is used to assign a first service key to the first cloud service under development. The first cloud service is authenticated for testing by at least one user. A first scope is created for use in testing the first cloud service with the production cloud system, in which the first scope restricts access of the first cloud service to the production cloud system. The cloud control plane is used to assign a first user of the production cloud system to the first scope. Access to the first cloud service and to the at least one production cloud service is provided to the first user.

At least one embodiment is directed to assigning a first administrator to the first user, for assisting the first user when the first user tests the first cloud service under development. A second administrator may be assigned to users of the production cloud system, in which the second administrator does not provide assistance to the first user. A third administrator may be assigned to a third user who is assigned to the first scope, and the third administrator may also be assigned to a fourth user who is assigned to a global scope of the production cloud service.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 8 depicts a user interface display for enabling a first user to select one or more services assigned to the same scope as the first user, in accordance with one or more illustrative aspects described herein.

FIG. 9 depicts a user interface display for enabling a second user to select one or more services assigned to the same scope as the second user, in accordance with one or more illustrative aspects described herein.

DETAILED DESCRIPTION

In the following description of the various embodiments, reference is made to the accompanying drawings identified above, which form a part hereof, and in which is shown by way of illustration various embodiments in which various aspects of the disclosure may be practiced. Other embodiments may be used, and structural and functional modifications may be made, without departing from the scope discussed herein. Various aspects are capable of other embodiments and of being practiced or being carried out in various different ways. In addition, the phraseology and terminology used herein are for the purpose of description and should not be regarded as limiting. Rather, the phrases and terms used herein are to be given their broadest interpretation and meaning. The use of □including□ and □comprising□ and variations thereof is meant to encompass the items listed thereafter and equivalents thereof as well as additional items and equivalents thereof.

As noted above, certain embodiments are discussed herein that relate to providing a native desktop (e.g., on a client device, such as a mobile device) using cloud-synchronized data, which may include data that has been mined (e.g., extracted, analyzed, and/or selectively stored) from another desktop remote from the native desktop provided on the client device. Before discussing these concepts in greater detail, however, several examples of computing architecture and enterprise mobility management architecture that may be used in implementing and/or otherwise providing various aspects of the disclosure will first be discussed with respect to FIGS. 1-4.

Figure 1:
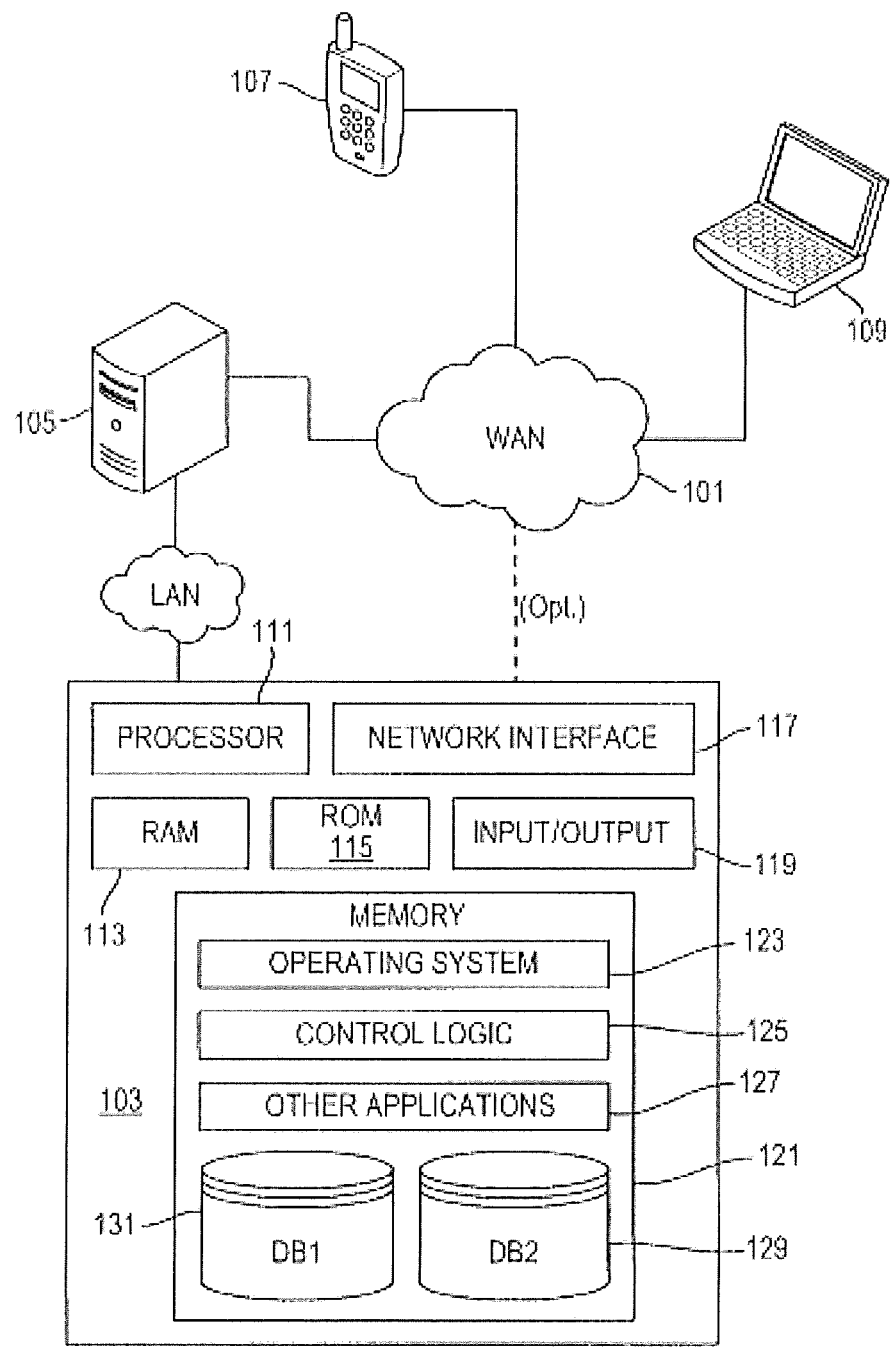
FIG. 1 depicts an illustrative computer system architecture that may be used in accordance with one or more illustrative aspects described herein.

Computer software, hardware, and networks may be used in a variety of different system environments, including standalone, networked, remote-access (aka, remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LANs), metropolitan area networks (MAN), wireless networks, personal networks (PAN), and the like. Network 101 is for illustration purposes and may be replaced with fewer or additional computer networks. A LAN may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term □network□ as used herein and depicted in the drawings refers not only to systems in which remote storage devices are coupled together via one or more communication paths, but also to stand-alone devices that may be coupled, from time to time, to such systems that have storage capability. Consequently, the term □network□ includes not only a □physical network□ but also a □content network,□ which is comprised of the data □attributable to a single entity□ which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the rate server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or may not be used in conjunction with aspects described herein. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Javascript or ActionScript. The computer executable instructions may be stored on a computer readable medium such as a nonvolatile storage device. Any suitable computer readable storage media may be used, including hard disks, CD-ROMs, optical storage devices, magnetic storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
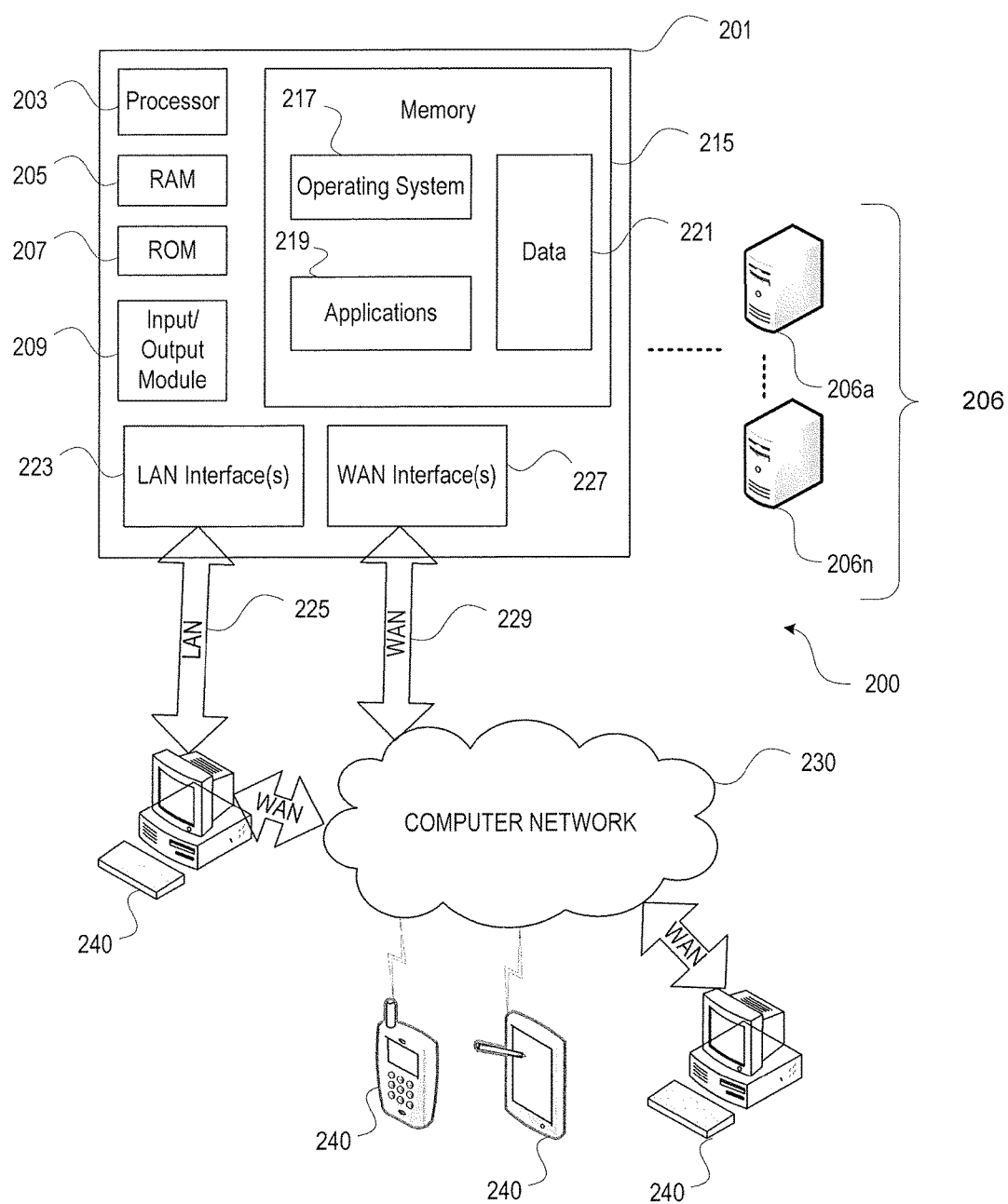
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a generic computing device 201 in an illustrative computing environment 200 that may be used according to one or more illustrative aspects described herein. Generic computing device 201 may be used as a server 206a in a single-server or multi-server desktop virtualization system (e.g., a remote access or cloud system) configured to provide virtual machines for client access devices. The generic computing device 201 may have a processor 203 for controlling overall operation of the server and its associated components, including random access memory (RAM) 205, read-only memory (ROM) 207, input/output (I/O) module 209, and memory 215.

I/O module 209 may include a mouse, keypad, touch screen, scanner, optical reader, and/or stylus (or other input device(s)) through which a user of generic computing device 201 may provide input, and may also include one or more of a speaker for providing audio output and a video display device for providing textual, audiovisual, and/or graphical output. Software may be stored within memory 215 and/or other storage to provide instructions to processor 203 for configuring generic computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices). The terminals 240 may be personal computers, mobile devices, laptop computers, tablets, or servers that include many or all of the elements described above with respect to the generic computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem 227 or other wide area network interface for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, PDAs, notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network PCs, mini-computers, mainframe computers, distributed computing environments that include any of the above systems or devices, and the like.

As shown in FIG. 2, one or more client devices 240 may be in communication with one or more servers 206a-206n (generally referred to herein as □server(s) 206□). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine client agent program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while and logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments, the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, SYMBIAN, etc.). In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a SSL VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b, and responds to the request generated by the client machine 240 with a response from the second server 206b. First server 206a may acquire an enumeration of applications available to the client machine 240 and well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

FIG. 2 shows a high-level architecture of an illustrative desktop virtualization system. As shown, the desktop virtualization system may be single-server or multi-server system, or cloud system, including at least one virtualization server 206 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system (OS) in which local and/or remote applications can be integrated. Applications may include programs that execute after an instance of an OS (and, optionally, also the desktop) has been loaded. Each instance of the OS may be physical (e.g., one OS per device) or virtual (e.g., many instances of an OS running on a single device). Each application may be executed on a local device, or executed on a remotely located device (e.g., remoted).

Figure 3:
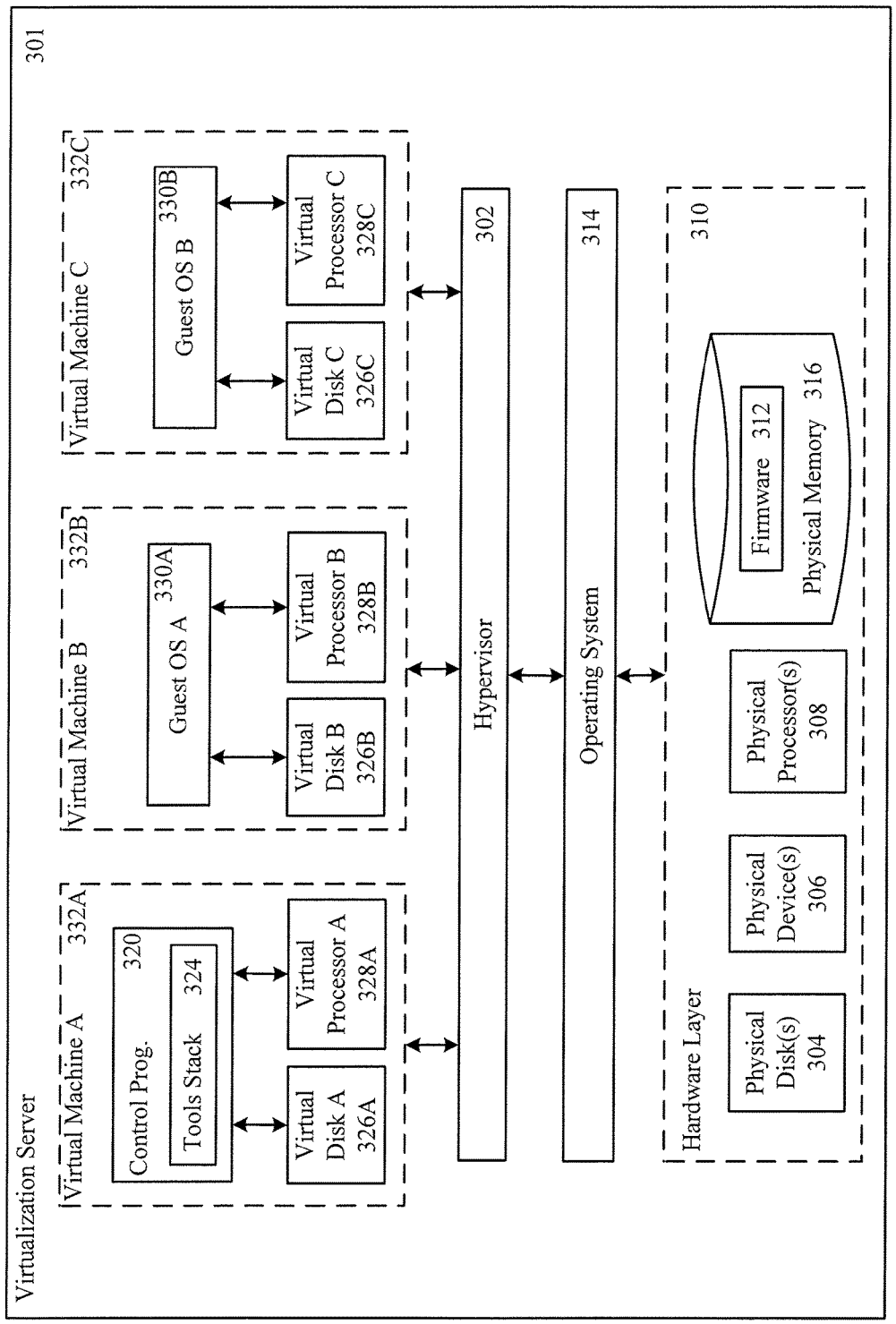
FIG. 3 depicts an illustrative virtualization (hypervisor) system architecture that may be used in accordance with one or more illustrative aspects described herein.

With further reference to FIG. 3, a computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308 and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more memory 216. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor that executes within an operating system 314 executing on the virtualization server 301. Virtual machines then execute at a level above the hypervisor. In some embodiments, the Type 2 hypervisor executes within the context of a user's operating system such that the Type 2 hypervisor interacts with the user's operating system. In other embodiments, one or more virtualization servers 201 in a virtualization environment may instead include a Type 1 hypervisor (Not Shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316 and any other component included in virtualization server 301 hardware layer 310. Hypervisor 302 may be used to emulate virtual hardware, partition physical hardware, virtualize physical hardware, and/or execute virtual machines that provide access to computing environments. In still other embodiments, hypervisor 302 controls processor scheduling and memory partitioning for a virtual machine 332 executing on virtualization server 301. Hypervisor 302 may include those by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, virtualization server 301 executes a hypervisor 302 that creates a virtual machine platform on which guest operating systems may execute. In these embodiments, the virtualization server 301 may be referred to as a host server. An example of such a virtualization server is the XEN SERVER provided by Citrix Systems, Inc.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may executes a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may presents at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, provides each virtual machine 332 with a unique virtual view of the physical hardware, memory, processor and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
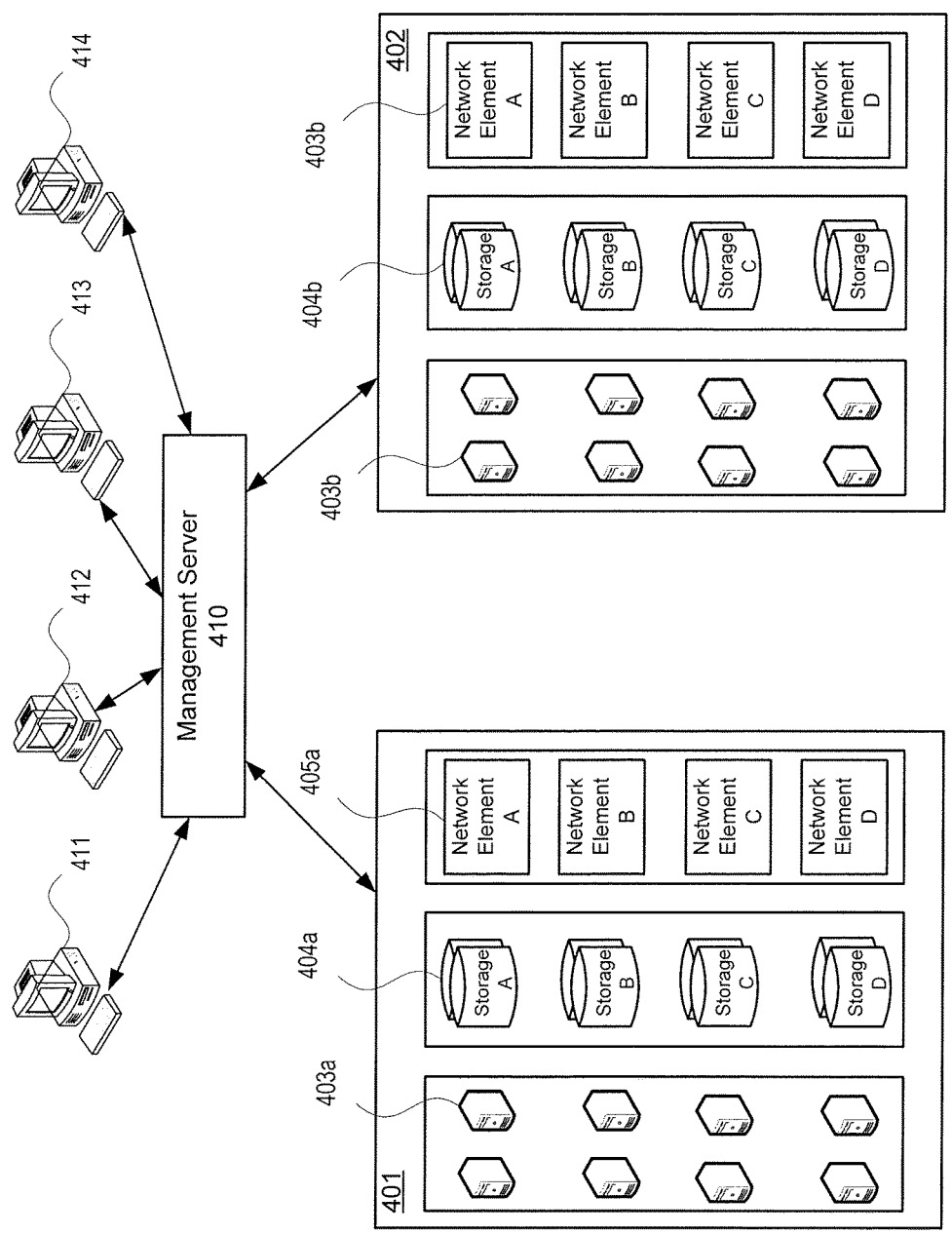
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403, storage resources 404, and network resources 405) of the cloud system.

Management server 410 may be implemented on one or more physical servers. The management server 410 may run, for example, CLOUDSTACK or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system. For example, the management server 410 may provide a set of APIs and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (by Microsoft Corporation), AMAZON EC2 (by Amazon.com Inc. of Seattle, Wash.), IBM BLUE CLOUD (by IBM Corporation of Armonk, N.Y.), or others.

Having discussed several examples of the computing architecture and the enterprise mobility management architecture that may be used in providing and/or implementing various aspects of the disclosure, a number of embodiments will now be discussed in greater detail. In particular, and as introduced above, some aspects of the disclosure generally relate to providing a scoped view of a cloud control plane that can be used for development and testing of cloud-based services.

When a new service is being developed for inclusion in a production cloud system, the new service under development should be thoroughly tested before the new service can be incorporated into the production cloud system and thus made available to all users of the production cloud system. While the new service under development is being tested out to ensure that the new service under development meets specific performance criteria (e.g., no software crashes of the new service, no long latency issues with respect to operations performed by the new service), which would enable the new service to then be added to the production cloud system, it should not adversely affect users accessing the production cloud system. Embodiments discussed in detail below provide such a mechanism for developing and testing a new service to be added to an existing production cloud system, with minimal effect on the existing production cloud service while the new service is being developed and tested with respect to specific performance criteria (e.g., 99.9999% availability of the cloud-based service).

Figure 5:
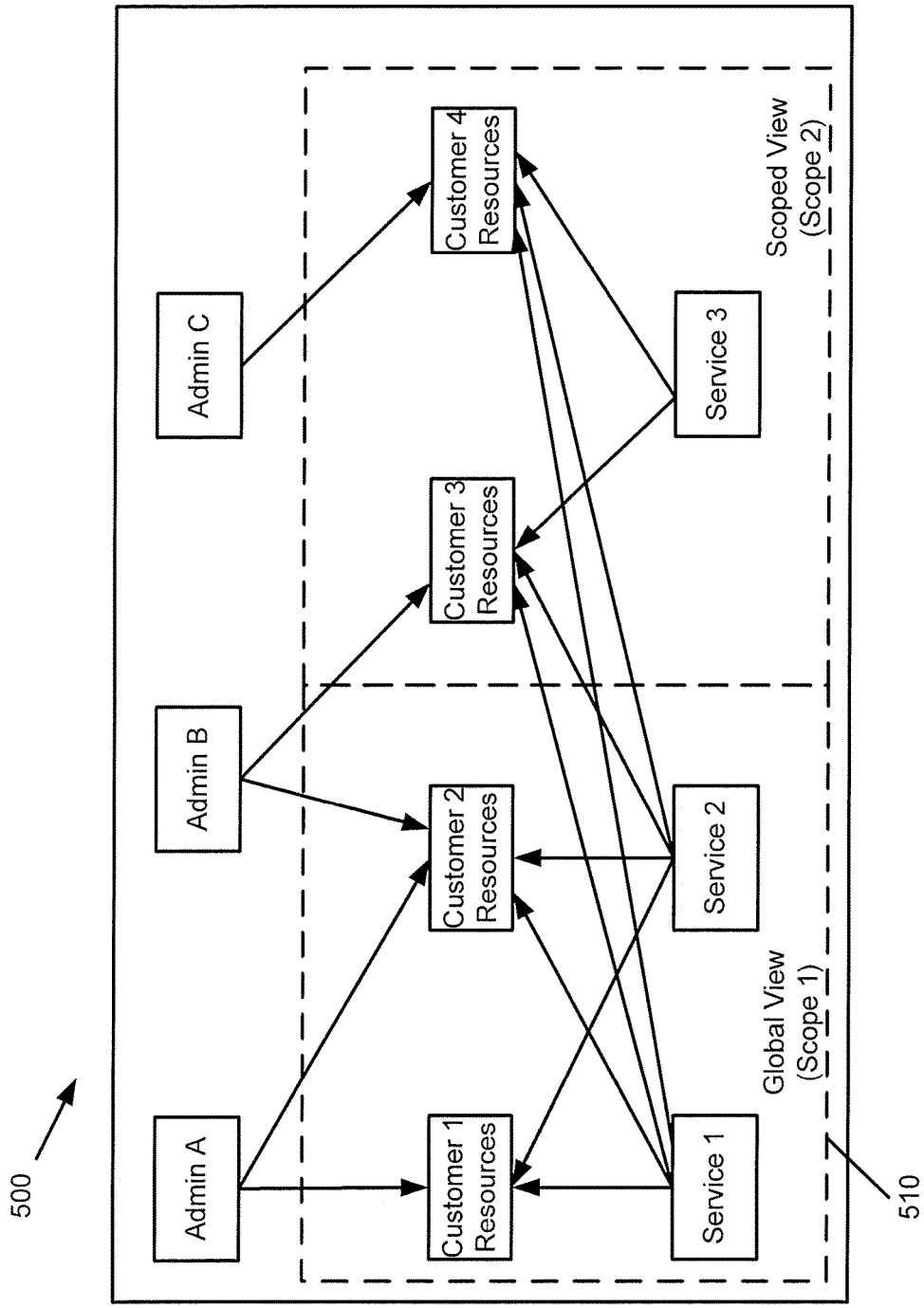
FIG. 5 depicts an illustrative cloud plane in which a new service is integrated with productions services based on scopes assigned to services, customers, and administrators, in accordance with one or more illustrative aspects described herein.

FIG. 5 depicts an illustrative cloud plane 500 in which a new cloud-based service may be integrated with production cloud-based services by assigning corresponding scopes to services and customers, in accordance with one or more embodiments. In FIG. 5, a production cloud system 510 includes Service 1 and Service 2. Customer 1 and Customer 2 are production customers who have full access to the production cloud system 510 (e.g., customers who have paid a fee for access to the production cloud system 510). A new service, Service 3, is under development and is to be tested, in which Customer 3 and Customer 4 are customers who are tasked with fully testing Service 3 to ensure that it does not adversely affect existing services (e.g., Service 1 and Service 2) of the production cloud system 510, for eventual inclusion of Service 3 as an additional service of the production cloud system 510. For example, Customer 3 and Customer 4 may be employees of a company that is responsible for setup and maintenance of the production cloud system 510, or they may be actual customers of a cloud-based system who are provided a cloud service fee discount for testing out the new service (Service 3) of the cloud-based system for a certain period of time.

Service 1 and Service 2 are provided with a full, global view ('Global' Scope 1) of the production cloud system 510, which enables full access to all components and data used by the production cloud system 510, and which enables all customers access to these services. Service 3 is provided with a limited scoped view ('Limited' Scope 2) of the cloud plane 500, in which Service 3 only has access to resources of Customer 3 and resources of Customer 4, who are assigned to the same scope as Service 3. Customer 3 and Customer 4 also have full access to Service 1 and Service 2 of the production cloud system 510. Customer 1 and Customer 2 do not have access to Service 3 that is not yet part of the production cloud system 510 and is still in a development and test phase. Within 'Limited' Scope 2, services and customers assigned to that scope have full control with respect to information (e.g., data, applications, customer resources, etc.) assigned to that same scope, in which each piece of information within a scope may be referred to as a □scoped block□. For example, Customer 3 assigned to 'Limited' Scope 2 has read and write access to information assigned to 'Limited' Scope 2, and Customer 2 assigned to 'Global' Scope 1 has read and write access to information assigned to 'Global' Scope 1.

As shown in FIG. 5, Administrator A is assigned to assist Customer 1 and Customer 2 with respect to any issues that they may have regarding the production cloud system 510. Administrator B is assigned to assist Customer 2 and Customer 3 with respect to accessing the cloud, in which Administrator B is assigned to a customer (Customer 2) assigned to the global view (Scope 1) and to a customer (Customer 3) assigned to the limited scoped view (Scope 2). Administrator C is assigned to assist Customer 4 respect to accessing the cloud, whereas Customer 4 is tasked with testing Service 3 and thus is assigned to the limited scope view (Scope 2). Administrators A, B, C may be network administrators who have □administrator□ privileges greater than normal ☐user☐ privileges, such as the ability to access files, data and software for resolving any network connection issues or other type of issues that customers may have when accessing the cloud.

Since Customer 1 and Customer 2 are 'production level' customers who have full access to the production cloud system 510, Customer 1 and Customer 2 have access to Service 1 and to Service 2, but they do not have access to Service 3 that is not part of the production cloud system 510 but instead is a service-under-test/development. Customer 3 and Customer 4, as part of the limited scoped view corresponding to Scope 2, have access to Service 3, and also have access to Service 1 and Service 2 of the production cloud system 510. That way, Customer 3 and Customer 4 can thoroughly develop and test Service 3 and ensure that Service 3 functions properly and does not adversely affect any of the other existing services of the production cloud system 510. Also, in some embodiments, when the scope assigned for testing Service 3 is deleted when Service 3 is ready to graduate from a test service to a production service, the test customers assigned to that same scope are also automatically deleted, so that information gathered during the testing phase for testing Service 3 is deleted and thus cannot corrupt the production cloud system when Service 3 is eventually moved there.

Figure 6:
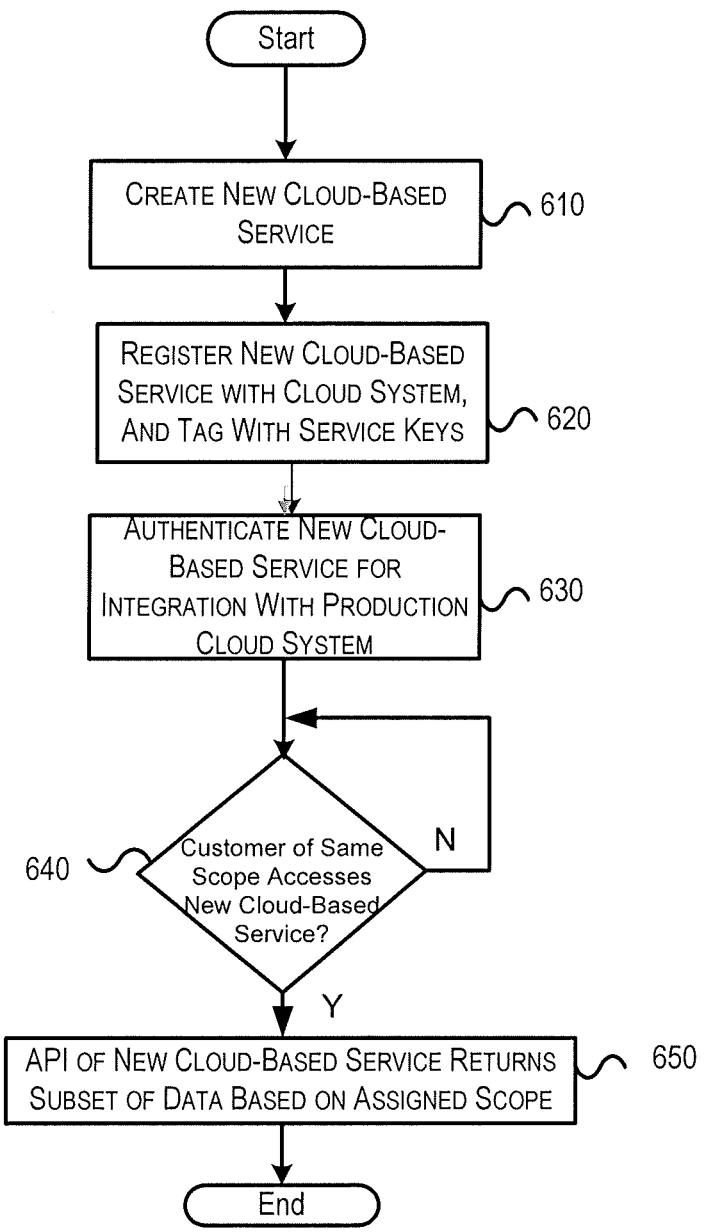
FIG. 6 depicts a flowchart that illustrates a method of assigning a new service with a scope for integration of the new service with existing production services of a cloud-based system, in accordance with one or more illustrative aspects described herein.

FIG. 6 is a flow chart illustrating the incorporation of a new cloud-based service with existing production cloud-based services of a production cloud system, according to one or more embodiments. In step 610, a new cloud-based service is created. In step 620, the new cloud-based service is registered with the cloud plane 500, and is tagged with one or more service keys. The service keys enable access by the new cloud-based service to certain portions of the production cloud system, such as databases that store information (e.g., files and applications) used by production cloud services and information regarding customer resources. In some embodiments, registration of the new cloud-based service includes the creation and uploading of a digital certificate from a certification authority (e.g., uploading a .pfx file that contains a public key and an associated private key) to the cloud-based system via the cloud control plane, and the entering of a private key for the uploaded digital certificate via the cloud control plane. The digital certificate may have a corresponding public key associated with the private key known only to the creator of the new service. The public key may be made available to potential users of the new cloud-based service for accessing the new cloud-based service.

In step 630, the new cloud-based service is authenticated for integration with the production cloud system (e.g., the new service has been created by an authorized developer, for testing with the production cloud system). Authentication may be made by any of a variety of ways, such as by verifying that the new cloud-based service includes a digital signature and hash value of a verified service creator. As part of the authentication of the new cloud-based service, a scope is assigned to the new cloud-based service. For example, a limited scope view corresponding to Scope 2 is assigned to the new cloud-based service. The assignment of Scope 2 is the mechanism in which the new cloud-based service may only access information associated with customers assigned to the same scope as the new cloud-based service (e.g., Customer 3 and Customer 4 are assigned to the same scope as Service 3 in FIG. 5). In some embodiments, service keys may be assigned to scopes, such that when a service is assigned to a particular scope, e.g., Scope 2, the service keys associated with that service may be tagged with the particular scope (e.g., Scope 2) during registration of the service with the cloud plane 500. As a result, during authentication of the new cloud-based service, the scope assigned to the new cloud-based service is added to any request made for the new cloud-based service by a customer, so that appropriate permissions can be enforced during execution of the new cloud-based service. For example, when a request by Customer 3 to Service 3 is received, operations performed by Service 3 with respect to execution of the request are tagged with the limited scoped view corresponding to Scope 2, to ensure that Service 3 does not have access to information associated with the production cloud system (e.g., Service 3 does not have access to information associated with Customer 1 and Customer 2).

In step 640, it is determined whether customer also assigned to Scope 2 has attempted to access the new cloud-based service. If No, the process returns to the start of Step 640 to continue to monitor for accesses to the new cloud-based service. If Yes, in step 650, an API of the new cloud-based service returns a subset of the data available based on the scope assigned to the new cloud-based service. For example, when a request is made to the new service to list all customers of the cloud-based service, and with reference to FIG. 5, only Customer 3 and Customer 4 that are assigned to Scope 2 are returned based on a request made to the new service (Service 3). In some embodiments, APIs associated with the new cloud-based service are tagged with keys associated with Scope 2, so that those APIs may only access information associated with test Customer 3 and test Customer 4 that are assigned the same keys (those associated with Scope 2), and not information associated with production Customer 1 and production Customer 2 (that are tagged with keys associated with the global Scope 1). For example, during testing of Service 3, bad data (e.g., corrupted data) may have been obtained due to problems associated with testing the new service. The bad data is kept from being made available to services of the production cloud system by the separate keys assigned to the test data that are not accessible by the production level services (Service 1 and Service 2).

With reference back to FIG. 5, Service 1 and Service 2, as part of the production cloud system 510, are assigned a global scope view as a default scope (e.g., Scope 1). Due to this assignment, Service 1 and Service 2 have access to information of Customer 1 and Customer 2 that are assigned to the production cloud system, but not information of Customer 3 and the Customer 4 that are assigned to the same limited scope (Scope 2) as Service 3. By having a global view, Scope 1, assigned as a default scope to the services (e.g., Service 1 and Service 2) of the production cloud system, configuration of the cloud system control plane remains consistent for the services of the production cloud system 510.

As part of Service 3 being assigned to Scope 2, Service 3 may be able to provide offerings to Customer 3 and to Customer 4 that are assigned to Scope 2, to allow those customers to subscribe to those offerings. Such offerings are not made available to Customer 1 and to Customer 2, since Service 3 is not yet part of the production cloud system. By way of example, if Service 1 is a MICROSOFT WORD application, Service 2 is a MICROSOFT EXCEL application, and Service 3 is a MICROSOFT VISIO application, Customer 3 will be provided with the ability to choose any one or more of these three services, whereas Customer 1 and Customer 2 will only be provided the ability to choose MICROSOFT WORD and/or MICROSOFT EXCEL (since the MICROSOFT VISIO application has not yet been fully tested to meet specific performance criteria of the production cloud system in this example).

Figure 7:
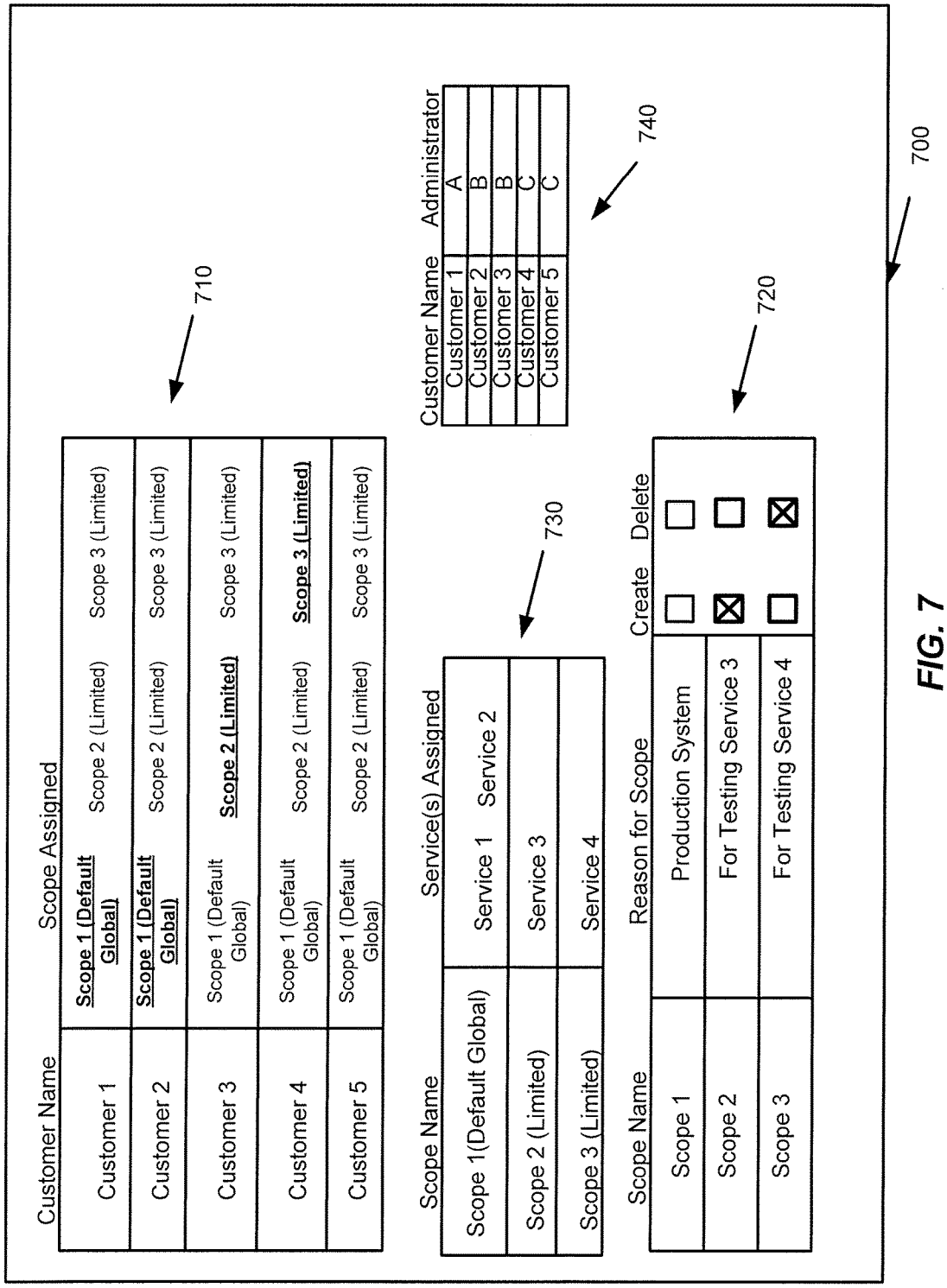
FIG. 7 depicts a user interface display for enabling an operator to assign a new service with a scope, for integration of the new service with existing services and existing customers of a cloud-based system, in accordance with one or more illustrative aspects described herein.

FIG. 7 shows a graphical user interface display 700 for enabling one or more customers, such as Customer 1, Customer 2, Customer 3 and Customer 4 of FIG. 5, to be assigned to a particular scope. A customer may be assigned to one of a plurality of scopes in a scope selection portion 710 of the display 700. For example, some customers may be assigned to the default, global scope view that provides global access to the production cloud system, and some customers may be assigned to a limited scope view for use in testing a new service such as Service 3 shown in FIG. 5. When a customer is assigned to a limited scope view, such as Scope 2, normal production services, such as Service 1 and Service 2 shown in FIG. 5, are also made visible in the limited scope view (along with Service 3), so that integration of the new service may be tested with a high degree of fidelity. Each customer and the associated resources of that customer are assigned to a scope by being tagged with that scope, so that normal production customers may be differentiated from test customers. As such, when a scope is deleted, the customers assigned to that deleted scope are also automatically deleted, and no longer have access to the production cloud system. This enables user-friendly provisioning of test environments that include a number of test customers, in which one or more of the test environments can be readily removed by deleting the scopes assigned to those test environments, which in turn deletes access to the production cloud system by customers who had been assigned to the deleted scope. Also, by deleting test customers after a service that was tested by the test customers is ready for graduation from a test service to a production service, the test customers are no longer needed and their information can be easily removed. The removal may be accomplished by deleting the stored test customer information (i.e., names, addresses, network addresses of the test customers) based on searching for tags provided with the stored customer information that match the tags associated with the deleted scope. As such, the test customer information may be deleted when the scope assigned to the test customer is deleted.

The assignment of scopes to services and customers (users) by way of the display shown in FIG. 7 are actions associated with the cloud control plane, and may be performed by an operator or someone with sufficient privileges (e.g., a network administrator, or a person who created the service for eventual inclusion into a cloud-based system) to make such assignments for a production cloud system. As shown in FIG. 7, the scope selection portion 710 of the display 700 includes IDs of customers already assigned to the production cloud system, and IDs of customers who have not yet been assigned to a scope. In FIG. 7, Customer 1 and Customer 2 have been assigned to a global scope, Scope 1, to enable Customer 1 and Customer 2 to access any service of the production cloud system that is not currently under development and/or test. Customer 3 and Customer 4 have been assigned to a limited scope, Scope 2, which enables Customer 3 and Customer 4 to access any service of the production cloud service, as well as any test service assigned to Scope 2. Customer 5 (Not Shown in FIG. 5) has not been assigned to any scope, and awaits assignment. For example, Customer 5 may be assigned to another limited scope, Scope 3, for testing Service 4 (Not Shown in FIG. 5), which is undergoing test and development. For example, the creator of Service 4 or a network administrator of the cloud service may have sufficient privileges to assign Customer 5 to Scope 3. This enables testing of Service 4 by Customer 5, whereas production Customer 1 and production Customer 2 are not made aware of this new test service.

A scope creation/deletion portion 720 of the display 700 enables an operator to create scopes for testing services, such as creating Scope 2 for testing Service 3 and creating Scope 3 for testing Service 4. After Service 3 has been thoroughly tested to ensure that it meets specific production performance criteria and is thus ready for incorporation into the production cloud system, Scope 2 may be deleted by way of the scope creation/deletion portion 720. Service 3 may then be assigned to Scope 1, as part of the production cloud system that would now include Service 1, Service 2 and Service 3. In some embodiments, a new scope is created for Service 3 when Service 3 is ready for inclusion in the production cloud system. The new scope is assigned a default, global view similar to the global scope assigned to Service 1 and Service 2. This provides for a convenient way to integrate new services that have yet to be fully tested with existing production services, without negatively affecting customers who are currently accessing the existing production services.

A scope assignment portion 730 of the display 700 enables an operator to assign scopes to one or more services. The operator may be the creator of a service to be tested, or by a network administrator assigned to support and maintain a cloud-based system, for eventual inclusion as a new service to an existing production cloud system. As shown in FIG. 7, Scope 1 (the default, global scope view) has been assigned Service 1 and Service 2 (both production services); Scope 2 (a limited scope view) has been assigned Service 3 (a service undergoing test/development); and Scope 3 (a limited scope view) has been assigned Service 4 (another service undergoing test/development).

An administrator assignment portion 740 of the display 700 provides a convenient way to assign administrators to customers by an operator, via the cloud control plane. Unlike services and customers, in some embodiments, administrators are not assigned to scopes, but rather are assigned to customers irrespective as to the scopes assigned to the customers. That way, an administrator may be assigned to customers of different scopes, such as Administrator B as shown in FIG. 5. For example, if Customer 2 and Customer 3 are located in the same geographical location, e.g., in Fort Lauderdale, Fla., it may make sense from a network communications perspective to assign an administrator, e.g., Administrator B, to assist those two customers, even though they are assigned to different scopes.

In other embodiments, administrators may be assigned to scopes in a similar manner to how customers and services are assigned to scopes. In these other embodiments, an administrator cannot be assigned to customers of different scopes, and thus Administrator B in FIG. 5 would have to be assigned to one or more customers of either the global Scope 1 or the limited Scope 2, but not both.

FIG. 8 shows a user interface display 800 that a test customer, such as Customer 3 of FIG. 5, may be provided with on his/her computer monitor or other type of display device, to select one or more services that are assigned to the same scope as the customer, according to one or more embodiments. The user interface display 800 may be provided on a computer monitor or other type of display device of the customer. As shown in FIG. 8, Customer 3 may select Service 3 from a list of development services assigned to the same scope (Scope 2) as Customer 3. Test Service 4 is assigned to a different scope (Scope 3) is not available for selection by Customer 3, and is grayed out on the user interface display 800 to indicate that this service is currently not available for selection by Customer 3.

In a similar manner, referring now to FIG. 9 shows a user interface display 900 that a different test customer, such as Customer 4 of FIG. 5, may be provided with on his/her computer monitor or other type of display device, to select one or more services that are assigned to the same scope as the customer, according to one or more embodiments. By way of the user interface display 900, Customer 4 may select Service 4 from the list of development services assigned to the same scope (Scope 3) as Customer 4. Test Service 3 is assigned to a different scope is not available for selection by Customer 4, and is grayed out on the user interface display 900 to indicate that this service is currently not available for selection by Customer 4. Service 1 and Service 2, as part of the production cloud system 510 as shown in FIG. 5, are also provided to both Customer 3 and Customer 4 for possible selection by way of the user interface displays 800 and 900 as respectively shown in FIGS. 8 and 9.

As illustrated above, various aspects of the disclosure relate to computer hardware and software for providing a scoped view of a cloud control plane to testing a new service for a cloud-based system, to enable seamless integration of the new service with an existing production service or services. While the subject matter has been described in language specific to structural features and/or methodological acts, it is to be understood that the subject matter defined in the appended claims is not necessarily limited to the specific features or acts described above. Rather, the specific features and acts described above are described as some example implementations of the following claims.

What is claimed is:

1. A method for integrating, into a cloud system accessible by a plurality of customers via a communications network, a first cloud service that is accessible by a first customer for testing the first cloud service, with a production cloud system that includes a second cloud service that is accessible by the first customer and by a second customer, the method comprising:
   registering, via a cloud control plane, the first cloud service with the cloud system;
   assigning, via the cloud control plane, a first scope to the first cloud service;
   assigning, via the cloud control plane, a second scope to the second cloud service;
   assigning, via the cloud control plane, the first customer to the first scope and the second customer to the second scope, the first scope providing access to the first cloud service by the first customer, the second scope providing access to the second cloud service by the second customer;
   performing a first operation based on a request made to the first cloud service by the first customer, the first operation not using information associated with the second customer;
   performing a second operation based on a request made to the second cloud service by the first customer, the second operation using information associated with the first customer and information associated with the second customer;
   receiving an indication that the first cloud service has not passed a testing phase and is not ready for incorporation into the production cloud system; and
   in response to receiving the indication, deleting the first scope from a set of available scopes that may be assigned to customers and services of the cloud system, wherein the deleting the first scope removes the first cloud service from the cloud system and removes access by the first customer to the production cloud system, and
   wherein the deleting the first scope deletes information associated with the first customer when the first customer accessed the first cloud service.

2. The method of claim 1, further comprising:
   providing information to the first customer regarding a capability of the first cloud service;
   receiving input from the first customer with respect to the first cloud service; and
   performing an operation by the first cloud service with respect to the input from the first customer.

3. The method of claim 1, further comprising:
   receiving a request by a third customer for testing the first cloud service;
   assigning, by input via the cloud control plane, the third customer to the first scope; and
   performing a third operation based on a request made to the first cloud service by the third customer, the third operation using information associated with the first and third customers and not using information associated with the second customer,
   wherein the assigning of the third customer to the first scope and the assigning of the first customer to the first scope are made by either an administrator of the cloud system or a creator of the first cloud service.

4. The method of claim 3, further comprising:
   assigning a first administrator of the cloud system to the first customer; and
   assigning a second administrator of the cloud system to the second customer and to the third customer.

5. The method of claim 4, further comprising:
   receiving a request by a fourth customer for accessing the production cloud system;
   assigning, by input via the cloud control plane, the fourth customer to the second scope; and
   performing a fourth operation based on a request made to the second cloud service by the first customer, the second customer, or the fourth customer, the fourth operation using information associated with the first, second, third and fourth customers.

6. The method of claim 1, further comprising:
   registering, via the cloud control plane, a third cloud service with the cloud system;
   assigning, via the cloud control plane, a third scope to the third cloud service;
   receiving an indication that the first cloud service has passed a testing phase and is ready for incorporation into the production cloud system;
   in response to receiving the indication, deleting the third scope;
   creating a fourth scope that provides access to all services and customers of the production cloud system; and
   assigning the fourth scope to the third cloud service.

7. The method of claim 6, wherein the deleting further comprises:
   deleting information associated with the first customer for testing the first cloud service via the first scope, but not deleting information associated with the first customer when the first customer accessed the second cloud service of the production cloud system.

8. The method of claim 6, wherein the assigning the fourth scope to the third cloud service further comprises:
   assigning the first customer to the fourth scope, wherein the assigning of the first customer to the fourth scope is made by either an administrator of the cloud system or a creator of the third cloud service.

9. The method of claim 1, further comprising:
receiving an indication that the first cloud service has not passed a testing phase and is not ready for incorporation into the production cloud system; and
in response to receiving the indication, deleting the first scope from a set of available scopes that may be assigned to customers and services of the cloud system,
wherein the deleting the first scope removes the first cloud service from the cloud system and removes access by the first customer to the production cloud system, and
wherein the deleting the first scope deletes information associated with the first customer when the first customer accessed the production cloud system.

10. One or more non-transitory computer-readable media storing instructions for testing a first cloud service that is accessible by a first customer for testing the first cloud service, with a production cloud system that includes a second cloud service that is accessible by the first customer and by a second customer, the instructions, when executed by a cloud-based system that includes at least one processor and a memory, cause the cloud-based system to:
register, via a cloud control plane, the first cloud service with the cloud-based system;
assign, via the cloud control plane, a first scope to the first cloud service;
assign, via the cloud control plane, a second scope to the second cloud service;
assign, via the cloud control plane, the first customer to the first scope and the second customer to the second scope, the first scope providing access to the first cloud service by the first customer, the second scope providing access to the second cloud service by the second customer;
perform an first operation based on a request made to the first cloud service by the first customer, the first operation not using information associated with the second customer;
perform a second operation based on a request made to the second cloud service by the first customer, the second operation using information associated with the first customer and information associated with the second customer;
receive an indication that the first cloud service has not passed a testing phase and is not ready for incorporation into the production cloud system; and
in response to receiving the indication, delete the first scope from a set of available scopes that may be assigned to customers and services of the cloud-based system,
wherein the delete the first scope removes the first cloud service from the cloud-based system and removes access by the first customer to the production cloud system, and
wherein the delete the first scope deletes information associated with the first customer when the first customer accessed the first cloud service.

11. The one or more non-transitory computer-readable media of claim 10, the instructions further causing the cloud-based system to:
provide information to the first customer regarding a capability of the first cloud service;
receive input from the first customer with respect to the first cloud service; and
perform an operation by the first cloud service with respect to the input from the first customer.

12. The one or more non-transitory computer-readable media of claim 10, the instructions further causing the cloud-based system to:
receive a request by a third customer for testing the first cloud service;
assign the third customer to the first scope; and
perform a third operation based on a request made to the first cloud service by the third customer, the third operation using information associated with the first and third customers and not using information associated with the second customer.

13. The one or more non-transitory computer-readable media of claim 12, the instructions further causing the cloud-based system to:
assign a first administrator to the first customer; and
assign a second administrator to the second customer and to the third customer.

14. The one or more non-transitory computer-readable media of claim 13, the instructions further causing the cloud-based system to:
receive a request by a fourth customer for accessing the production cloud system;
assign the fourth customer to the second scope; and
perform a fourth operation based on a request made to the second cloud service by the first customer, the second customer, or the fourth customer, the fourth operation using information associated with the first, second, third and fourth customers.

15. The one or more non-transitory computer-readable media of claim 10, the instructions further causing the cloud-based system to:
register, via the cloud control plane, a third cloud service with the cloud-based system;
assign, via the cloud control plane, a third scope to the third cloud service;
receive an indication that the third cloud service has passed a testing phase and is ready for incorporation into the production cloud system;
in response to receiving the indication, delete the third scope;
create a fourth scope that provides access to all services and customers of the production cloud system; and
assign the fourth scope to the third cloud service.

16. The one or more non-transitory computer-readable media of claim 15, wherein delete the scope further comprises:
delete information associated with the first customer for testing the first cloud service via the first scope, but not delete information associated with the first customer when the first customer accessed the second cloud service of the production cloud system.

17. The one or more non-transitory computer-readable media of claim 15, wherein the assign the fourth scope to the third cloud service further comprises:
assign the first customer to the fourth scope,
wherein the assign of the first customer to the fourth scope is made by either an administrator of the cloud-based system or a creator of the third cloud service.

18. The one or more non-transitory computer-readable media of claim 10, the instructions further causing the cloud-based system to:
receive an indication that the first cloud service has not passed a testing phase and is not ready for incorporation into the production cloud system; and in response to receiving the indication, delete the first scope from a set of available scopes that may be assigned to customers and services of the cloud-based system, wherein the deleting the first scope removes the first cloud service from the cloud-based system and removes access by the first customer to the production cloud system, and wherein the deleting the first scope deletes information associated with the first customer when the first customer accessed the production cloud system.

19. An apparatus, comprising:
one or more processors; and
memory storing instructions that, when executed by the one or more processors, cause the apparatus to:
register a first cloud service with a cloud system, the first cloud service comprising a service that is to undergo testing in the cloud system;
assign a first scope to the first cloud service, the first scope providing access by the first cloud service to a first customer;
assign a second scope to a second cloud service, the second scope providing access by the second cloud service to a second customer, the second cloud service comprising a service to that has previously undergone testing and is currently a production level service in the cloud system;
assign the first customer to the first scope and the second customer to the second scope;
perform a first operation based on a request made to the first cloud service by the first customer, the first operation not using information associated with the second customer;
perform a second operation based on a request made to the second cloud service by the first customer, the second operation using information associated with the first customer and information associated with the second customer;
receive an indication that the first cloud service has not passed a testing phase and is not ready for incorporation into a production cloud system; and
delete, in response to receiving the indication, the first scope from a set of available scopes that may be assigned to customers and services of the cloud system,
wherein the delete the first scope removes the first cloud service from the cloud system and removes access by the first customer to the production cloud system, and
wherein the delete the first scope deletes information associated with the first customer when the first customer accessed the first cloud service.

20. The apparatus of claim 19, further comprising:
provide information to the first customer regarding a capability of the first cloud service;
receive input from the first customer with respect to the first cloud service; and
perform an operation by the first cloud service with respect to the input from the first customer.

\* \* \* \* \*